(12) United States Patent
Kamiya et al.

(10) Patent No.: US 12,107,824 B2
(45) Date of Patent: Oct. 1, 2024

(54) COUNTRY ESTIMATION DEVICE, COUNTRY ESTIMATION METHOD AND COUNTRY ESTIMATION PROGRAM

(71) Applicant: NIPPON TELEGRAPH AND TELEPHONE CORPORATION, Tokyo (JP)

(72) Inventors: Kazunori Kamiya, Musashino (JP); Bo Hu, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 29 days.

(21) Appl. No.: 17/619,252

(22) PCT Filed: Jul. 10, 2019

(86) PCT No.: PCT/JP2019/027392
§ 371 (c)(1),
(2) Date: Dec. 15, 2021

(87) PCT Pub. No.: WO2021/005758
PCT Pub. Date: Jan. 14, 2021

(65) Prior Publication Data
US 2022/0360556 A1    Nov. 10, 2022

(51) Int. Cl.
*H04L 61/5007* (2022.01)
*H04L 45/74* (2022.01)
*H04L 101/69* (2022.01)

(52) U.S. Cl.
CPC .......... *H04L 61/5007* (2022.05); *H04L 45/74* (2013.01); *H04L 2101/69* (2022.05)

(58) Field of Classification Search
CPC ................. H04L 2101/69; H04L 45/74; H04L 61/5007; H04L 67/02; H04L 67/1021; G06F 16/955; G06F 16/909

USPC ........................................................ 709/245
See application file for complete search history.

(56) References Cited

U.S. PATENT DOCUMENTS

| 2003/0226009 | A1* | 12/2003 | Maeda | H04L 63/0428 |
| | | | | 713/150 |
| 2007/0055749 | A1 | 3/2007 | Chien | |
| 2007/0156900 | A1 | 7/2007 | Chien | |
| 2007/0220605 | A1 | 9/2007 | Chien | |

(Continued)

FOREIGN PATENT DOCUMENTS

| JP | 2016-532381 A | 10/2016 | |
| WO | WO-2013032581 A1 * | 3/2013 | ......... G06Q 30/0261 |

OTHER PUBLICATIONS

Location-Based IP Addressing in IP-Enable Wireless Sensor Networks Rong Ding;Haiying Du 2011 International Conference on Control, Automation and Systems Engineering (CASE) (Year: 2011) (Year: 2011).*

Location-Based IP Addressing in IP-Enable Wireless Sensor Networks Rong Ding;Haiying Du 2011 International Conference on Control, Automation and Systems Engineering (CASE) (Year: 2011).*

(Continued)

*Primary Examiner* — Chirag R Patel
(74) *Attorney, Agent, or Firm* — XSENSUS LLP (57) ABSTRACT

A country estimation device includes processing circuitry configured to collect path information for each IP address, extract attribute information assigned to the collected path information, and estimate a country where the IP address is located by referring to attribute information indicating a country at a link destination of a path of the path information among the extracted attribute information.

10 Claims, 6 Drawing Sheets

(56) References Cited

U.S. PATENT DOCUMENTS

| | | | |
|---|---|---|---|
| 2008/0010367 A1* | 1/2008 | Chen | G01S 5/0289 |
| | | | 709/223 |
| 2013/0333038 A1 | 12/2013 | Chien | |
| 2014/0280881 A1* | 9/2014 | Szamonek | H04L 43/0852 |
| | | | 709/224 |
| 2015/0229609 A1 | 8/2015 | Chien | |
| 2016/0248795 A1 | 8/2016 | Chien | |
| 2018/0198796 A1 | 7/2018 | Chien | |
| 2019/0007503 A1* | 1/2019 | Zmijewski | H04L 43/0823 |
| 2019/0238454 A1* | 8/2019 | Celozzi | H04L 41/0806 |
| 2020/0226541 A1* | 7/2020 | Mushikabe | G06Q 10/087 |
| 2020/0364762 A1* | 11/2020 | Nakazato | G06Q 30/06 |
| 2021/0234790 A1* | 7/2021 | Nisenblat | H04L 45/26 |
| 2022/0279050 A1* | 9/2022 | Zmijewski | H04L 67/52 |
| 2023/0259571 A1* | 8/2023 | Shribman | H04L 69/40 |
| | | | 709/217 |

OTHER PUBLICATIONS

Endo et al., "Whois Based Geolocation: A Strategy to Geolocate Internet Hosts", ResearchGate, 24th IEEE International Conference on Advanced Information Networking and Applications, Available Online At: URL: https://jprs.ip/about/dom-search/whois/, May 29, 2019, pp. 408-413.

Dong et al., "Network Measurement Based Modeling and Optimization for IP Geolocation", Computer Networks, vol. 56, 2012, pp. 85-98.

Snijders et al., "Use of BGP Large Communities", Internet Engineering Task Force (IETF), Request for Comments: 8195, Available Online At: https://www.rfceditor.org/rfc/pdfrfc/rfc8195.txt.pdf, Jun. 2017, 3 pages.

Yoshimura, "World Trends of BGP Community", Available Online At: http://largebgpcommunities.net/presentations/2016-11-29-internet-week-bgp-community-yoshimura.pdf, Nov. 29, 2016, 12 pages.

* cited by examiner

| Region 1 country origins (65001:20--) | |
|---|---|
| 65001:2000 | Country 1 |

| Region 2 country origins (65001:22--) | |
|---|---|
| 65001:2201 | Country 2 |
| 65001:2202 | Country 3 |
| 65001:2203 | Country 4 |
| 65001:2204 | Country 5 |
| 65001:2205 | Country 6 |
| 65001:2207 | Country 7 |
| 65001:2208 | Country 8 |
| 65001:2209 | Country 9 |
| 65001:2210 | Country 10 |
| 65001:2211 | Country 11 |
| 65001:2212 | Country 12 |
| 65001:2213 | Country 13 |
| 65001:2214 | Country 14 |
| 65001:2215 | Country 15 |

| Region 3 country origins (65001:24--) | |
|---|---|
| 65001:2401 | Country 21 |
| 65001:2402 | Country 22 |
| 65001:2403 | Country 23 |
| 65001:2404 | Country 24 |
| 65001:2405 | Country 25 |
| 65001:2406 | Country 26 |
| 65001:2407 | Country 27 |
| 65001:2408 | Country 28 |
| 65001:2409 | Country 29 |
| 65001:2410 | Country 30 |

| Region 4 country origins (65001:26--) | |
|---|---|
| 65001:2601 | Country 31 |

| Community | Description |
|---|---|
| 65001:410 | Customer |
| 65001:420 | Peer |

Fig. 3

| prefix | 192.168.82.0/24 |
|---|---|
| ASnum | 65500 |
| Community | ['65002:22', '65003:4503', '65004:2011', '65005:54900', '65004:2991', 'no-export', '65006:37232', '65001:1408', '65006:5000', '65007:333', '65001:3400', '65008:380', '65002:11078', '65005:30333', '65005:50001', '65009:103', '65010:2000', '65002:2', '65011:65511', '65002:3', '65012:31', '65003:4991', '65002:2011', '65002:2012', '65013:9002', '65001:2401', '65011:65499', '65002:86', '65002:666', '65004:31826', '65001:410', '65003:28610', '65009:12', '65003:29', '65005:8039', '65014:9001', '65013:64615', '65005:51200', '65004:2950', '65003:888', '65015:6939', '65004:2017', '65005:8059', '65009:100', '65005:54901', '65016:1104', '65005:51100', '65002:500', '65005:30332', '65011:65497', '65017:1006', '65018:65002', '65004:34076', '65015:100', '65023:6461', '65003:19', '65005:51202', '65002:575', '65003:18', '65002:10984', '65019:22013', '65005:30183', '65017:3055', '65017:1030', '65004:30840', '65004:32344', '65016:1601', '65003:49', '65020:5000', '65005:51104', '65003:3001', '65004:2352', '65021:39710', '65022:1050', '65004:2521', '65005:50002', '65019:21000', '65003:28', '65017:1004', '65002:2003', '65002:2064', '65005:8011', '65004:33036', '65003:800', '65011:65493'] |

Fig. 4

| prefix | 192.168.82.0/24 | |
|---|---|---|
| ASnum | 65500 | |
| ORG | Organization 2 | ~A |
| Country | Country 16 | |
| Area | Region 2 | |
| 65001_community | ['65001:1408', '65001:3400', '65001:2401', '65001:410'] | ~B |
| 65001_linktype | customer | |
| 65001_region | Region 3 | |
| 65001_country | Country 21 | |
| 65001_city | City 1 | |
| 65002_community | ['65002:2012', '65002:2064', '65002:22', '65002:3', '65002:500', '65002:575', '65002:666', '65002:86'] | |
| 65002_linktype | peer | |
| 65002_region | ?? | |
| 65002_country | Country 2, Country 1 | |
| 65002_city | ?? | |

Fig. 5

| | |
|---|---|
| prefix | 192.168.82.0/24 |
| ASnum | 65500 |
| ORG | Organization 2 |
| Country | Country 21 |
| Area | Region 3 |
| 65001_community | ['65001:1408', '65001:3400', '65001:2401', '65001:410'] |
| 65001_linktype | customer |
| 65001_region | Region 3 |
| 65001_country | Country 21 |
| 65001_city | City 1 |
| 65002_community | ['65002:2012', '65002:2064', '65002:22', '65002:3', '65002:500', '65002:575', '65002:666', '65002:86'] |
| 65002_linktype | peer |
| 65002_region | ?? |
| 65002_country | Country 2, Country 1 |
| 65002_city | ?? |

⋮

(ORG/Country/Area block marked A; 65001_* block marked C)

Fig. 7

COUNTRY ESTIMATION DEVICE, COUNTRY ESTIMATION METHOD AND COUNTRY ESTIMATION PROGRAM

CROSS-REFERENCE TO RELATED APPLICATION

The present application is based on PCT filing PCT/JP2019/027392, filed Jul. 10, 2019, the entire contents of which are incorporated herein by reference.

TECHNICAL FIELD

The present invention relates to a country estimation device, a country estimation method, and a country estimation program.

BACKGROUND ART

Currently, the Internet is used as an infrastructure in society, and various services have been developed. On the Internet, communication from a transmission source IP address to a destination IP address is performed by using an IP (Internet Protocol) protocol.

In diversified services developed on the Internet, it is important to grasp countries where the transmission source IP and the destination IP address are located. For example, in a video distribution service, control on video to be distributed is performed on the basis of country information of the transmission source IP. In addition, for sale of a product on the Internet, whether or not the product can be delivered is checked on the basis of the country information of the transmission source IP. For cyber security too, grasping of the country information from the IP address is important. For example, when a certain attack is observed, an originating country of the attack is grasped from the country information of the transmission source IP.

Up to now, for example, a technology for solving the country information of the IP address by using information registered in an open database of an organization that holds the IP address is known (see Non-Patent Literature 1). In addition, a technology for estimating the country information by actively searching for the IP address and using a response time or the like is known (see Non-Patent Literature 2).

CITATION LIST

Non-Patent Literature

Non-Patent Literature 1: "Whois Based Geolocation: a strategy to geolocate Internet Hosts", [online], 2010, ResearchGate, [Searched on May 29, 2019], the Internet <URL: https://jprs.jp/about/dom-search/whois/>

Non-Patent Literature 2: Ziqian Dong, Rohan D. W. Perera, Rajarathnam Chandramouli, K. P. Subbalakshmi, "Network measurement based modeling and optimization for IP geolocation", Computer Networks 56 (2012), pp. 85-98

SUMMARY OF THE INVENTION

Technical Problem

However, according to the technologies in the related art, it may be difficult to accurately grasp a country where an IP address is located. For example, in a case where the organization that holds the IP address is a multinational corporation having bases over the world, there are cases where the IP address can not be correctly associated with the country information by using the registered information of the open database. In addition, in a case where the country information is estimated by actively searching for the IP address, it is necessary to arrange a large number of nodes in each country. Thus, not only implementation is not easy, but also an accuracy of an estimation result may be low.

The present invention has been made in view of the above, and it is an object to highly accurately estimate a country where an IP address is located.

Means for Solving the Problem

To solve the above-described problem and to achieve the object, a country estimation device according to the present invention includes processing circuitry configured to collect path information for each IP address, extract attribute information assigned to the collected path information, and estimate a country where the IP address is located by referring to attribute information indicating a country at a link destination of a path of the path information among the extracted attribute information.

Effects of the Invention

According to the present invention, it is possible to highly accurately estimate the country where the IP address is located.

BRIEF DESCRIPTION OF DRAWINGS

FIG. 3 is a diagram for describing processing of an extraction unit.

FIG. 4 is a diagram for describing processing of an estimation unit.

DESCRIPTION OF EMBODIMENTS

Hereinafter, with reference to the drawings, one embodiment of the present invention will be described in detail. Note that the present invention is not limited by this embodiment. In addition, in the description of the drawings, the same part is assigned with the same reference sign for the illustration.

Figure 1:
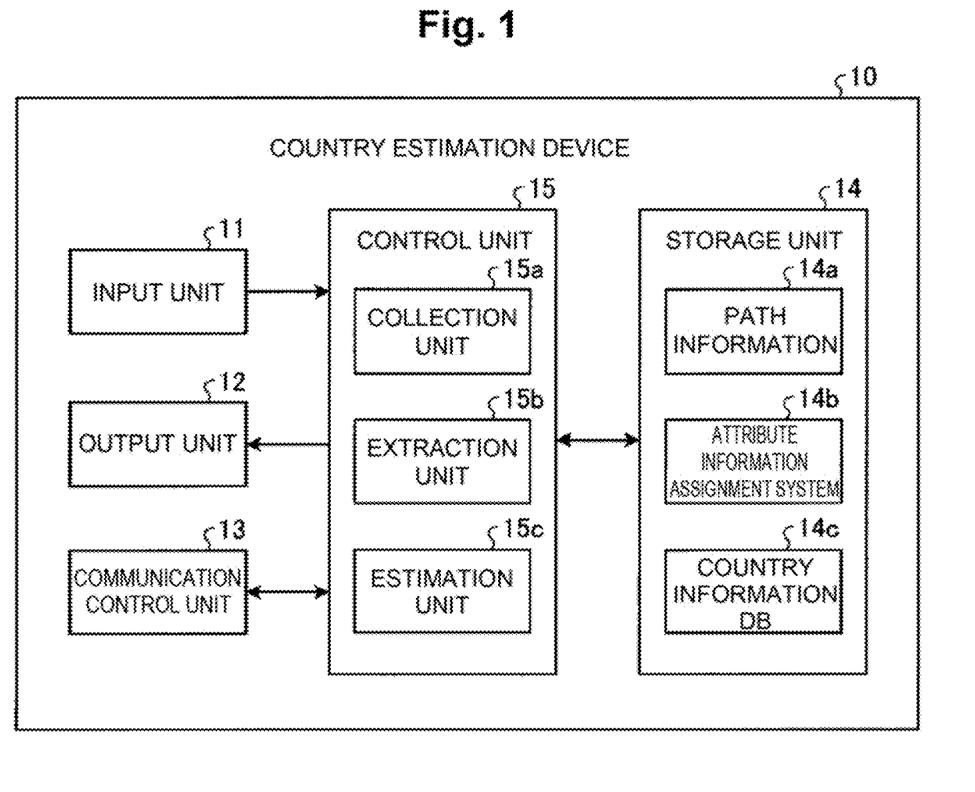
FIG. 1 is a schematic diagram exemplifying an outline configuration of a country estimation device of the present embodiment.

[Configuration of Country Estimation Device] FIG. 1 is a schematic diagram exemplifying an outline configuration of a country estimation device of the present embodiment. As exemplified in FIG. 1, a country estimation device 10 of the present embodiment is realized by a general-use computer such as a personal computer, and is provided with an input unit 11, an output unit 12, a communication control unit 13, a storage unit 14, and a control unit 15.

The input unit 11 is realized by using an input device such as a keyboard or a mouse, and inputs various types of instruction information such as processing start to the control unit 15 corresponding to an input operation by an operator. The output unit 12 is realized by a display device such as a liquid crystal display, a print device such as a printer, or the like. For example, an estimation result of country estimation processing which will be described below is displayed on the output unit 12.

The communication control unit 13 is realized by an NIC (Network Interface Card) or the like, and controls communication between an external device and the control unit 15 via a telecommunication circuit such as a LAN (Local Area Network) or the Internet. For example, the communication control unit 13 controls communication between a management device or the like of each AS (Autonomous System) which manages path information utilized or disclosed by the AS such as each ISP (Internet Service Provider), an assignment system of attribute information assigned to the path information, and the like, and the control unit 15. Alternatively, the communication control unit 13 controls communication between a management device that manages information of an organization that holds an IP address and the control unit 15.

The storage unit 14 is realized by a semiconductor memory element such as a RAM (Random Access Memory) or a Flash Memory, or a storage device such as a hard disc or an optical disc. A processing program for operating the country estimation device 10, data used during execution of the processing program, and the like are stored in the storage unit 14 in advance, or temporarily stored each time processing is performed. Note that the storage unit 14 may also be configured to communicate with the control unit 15 via the communication control unit 13.

According to the present embodiment, the storage unit 14 stores path information 14a, an attribute information assignment system 14b, a country information database (DB) 14c, and the like. Prior to the country estimation processing which will be described below, a collection unit 15a collects the path information 14a and the attribute information assignment system 14b from the management device or the like of each AS which manages the path information utilized or disclosed by each AS, the assignment system of the attribute information assigned to the path information, and the like, and stores the path information and the attribute information assignment system in the storage unit 14. Note that the configuration is not limited to such a case that these various types of information are stored in the storage unit 14 of the country estimation device 10, and the information may also be collected when the country estimation processing which will be described below is executed, for example.

The path information 14a is information used for determining to which host a host such as a router connected to the network is to subsequently transmit a received packet, and includes information of a forwarding path for each destination IP address. The path information 14a is defined by an administrator of a host of AS and exchanged with another AS to be used for the operation in each AS. In addition, the path information 14a includes attribute information assigned by each AS.

Figure 2:
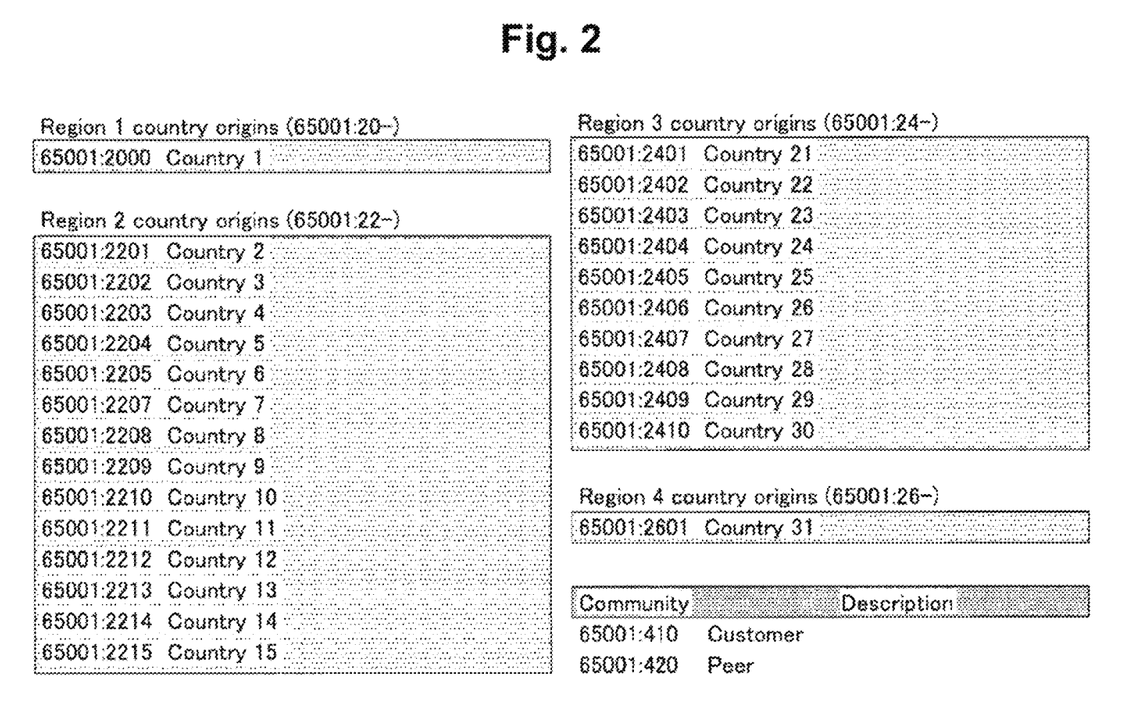
FIG. 2 is a diagram exemplifying an attribute information assignment system.

The attribute information assignment system 14b is an assignment system of the attribute information assigned by each AS to the path information 14a. Herein, FIG. 2 is a diagram exemplifying the attribute information assignment system 14b. In the example illustrated in FIG. 2, a community attribute configured by a 16-bit AS number and a 16-bit attribute value uniquely defined by each AS is exemplified as the attribute information. FIG. 2 illustrates a list of community attribute values assigned by the AS with an AS number "65001" serving as an assignment source to the path information utilized in its own AS. Note that in the following description and drawings, the AS number and the IP address use values in a private area. In addition, names of countries, cities, organizations, and the like are made abstract for the description.

As exemplified in FIG. 2, the community attribute includes country information (county origins) for each region at a link destination of a path of the path information and a link type. The link type means a classification on whether the link destination of the path of the path information is a customer of its own AS (in the example of FIG. 2, "65001:410 Customer") or an adjacent AS (Peer, in the example of FIG. 2, "65001:420 Peer"). The AS serving as the assignment source assigns any country information at the link destination of the path of the path information and any link type to the path information.

Note that the attribute information assigned by the AS may include other information. For example, the community attribute may further include attribute information indicating a city at the link destination of the path of the path information.

The description will be provided with reference to FIG. 1 again. The country information DB 14c stores an estimation result of the country estimation processing which will be described below. For example, the country information DB 14c stores a range of IP addresses represented by a prefix and the country information of the estimation result in association with each other.

The control unit 15 is realized by using a CPU (Central Processing Unit) or the like, and executes a processing program stored in a memory. Thus, as exemplified in FIG. 1, the control unit 15 functions as the collection unit 15a, an extraction unit 15b, and an estimation unit 15c. Note that these function units may also be respectively, or partially, implemented to different pieces of hardware. In addition, the control unit 15 may also be provided with other function units.

The collection unit 15a collects the path information utilized or disclosed by each AS from the management device or the like of each AS via the input unit 11 or the communication control unit 13, and stores the path information in the storage unit 14. In addition, the collection unit 15a collects the attribute information assignment system of the attribute information assigned by each AS to the path information from the management device or the like of each AS via the input unit 11 or the communication control unit 13, and stores the attribute information assignment system in the storage unit 14.

In addition, the collection unit 15a may also collect the information of the organization that holds the IP address and store the information in the storage unit 14. Note that the collection unit 15a may collect these pieces of information without being stored in the storage unit 14 when the processing which will be described below is executed.

In addition, the collection unit 15a collects the path information 14a for each IP address. That is, the collection unit 15a collects the path information 14a of a processing target for each destination IP address.

The extraction unit 15b extracts the attribute information assigned to the collected path information 14a. Herein, FIG. 3 is a diagram for describing processing of the extraction unit 15b. In the example illustrated in FIG. 3, the processing is exemplified in which the path information 14a with a destination IP address "192.168.82.0/24" and an affiliated AS number "65500" of the destination IP address is targeted. Herein, the destination IP address is represented in a range of the IP addresses as a prefix. In addition, as illustrated in FIG. 3, the attribute information (Community) such as '65002:22' or '65003.4503' is extracted.

The estimation unit 15c refers to the attribute information indicating the country at the link destination of the path of the path information among the extracted attribute information, and estimates the country where the IP address is located. Specifically, the estimation unit 15c refers to the attribute information assignment system 14b of each AS and identifies the country information at the link destination of the path of the path information assigned by the AS to estimate this as the country information of the IP address.

The estimation unit 15c further refers to the attribute information indicating the region where the city or the country at the link destination of the path of the path information is included among the extracted attribute information, and estimates the city or the region where the IP address is located.

For example, the estimation unit 15c refers to the attribute information assignment system 14b of each AS illustrated in FIG. 2, and identifies the country information for each region at the link destination of the path of the path information assigned by the AS to estimate this region and country information as the country information and the area information of the destination IP address.

In addition, in a case where the extracted attribute information includes the attribute information indicating the city at the link destination of the path of the path information, the estimation unit 15c can identify the city by referring to the attribute information assignment system 14b, and estimate this city as city information of the destination IP address.

The estimation unit 15c further tabulates the extracted attribute information for each assignment system, and refers to the attribute information of the assignment system including the attribute information indicating that the link destination of the path of the path information is the IP address under the assignment source of the attribute information to estimate the country where the IP address is located.

Figure 5:
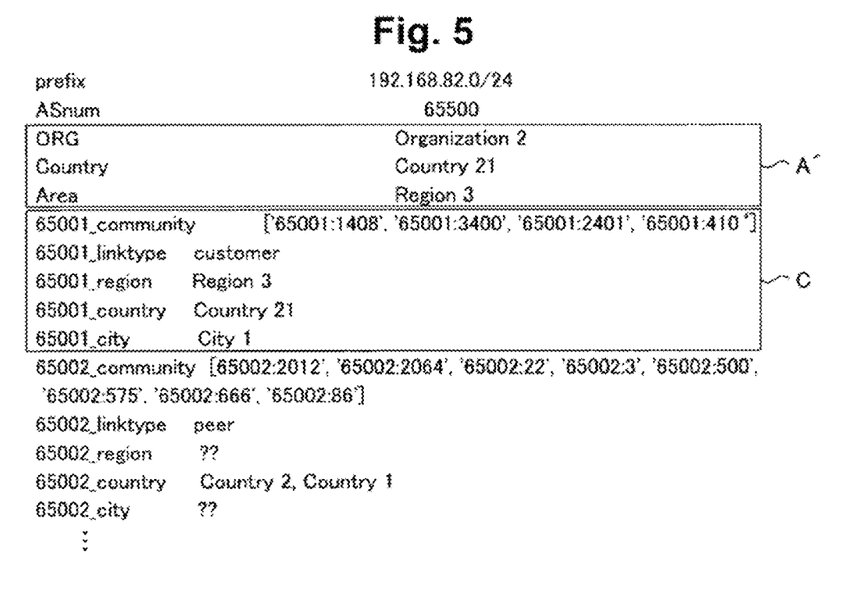
FIG. 5 is a diagram for describing estimation.

Herein, FIG. 4 and FIG. 5 are diagrams for describing the processing of the estimation unit 15c. Specifically, first, the estimation unit 15c tabulates the attribute information for each assignment system, that is, for each AS. In addition, the estimation unit 15c refers to the attribute information assignment system 14b of each AS, and identifies the country at the link destination of the path of the path information and the link type.

In the example illustrated in a section B of FIG. 4, with regard to the AS numbers "65001" and "65002", the attribute information (community) assigned by each AS to the path information is tabulated. In addition, a city, a country, and a region where the country is included at a link destination of the path assigned by each AS, and the linktype are identified.

Herein, in a case where the link destination of the path of the path information is an IP address under the AS as the assignment source of the attribute information, that is, in a case where the link type is a customer, the estimation unit 15c sets the identification result based on the attribute information assigned by this AS which is illustrated in a section C of FIG. 5 as the estimation result. In other words, the estimation unit 15c adopts the estimation result based on the attribute information since the attribute information assigned by the AS to the path information of its own customer is regarded as more reliable information.

Note that in a case where the attribute information by the same AS includes the attribute information indicating a plurality of countries, the determination may be based on a rule of majority.

Furthermore, in a case where the estimated country is different from the country of the IP address identified by referring to the information of the organization that holds the IP address, the estimation unit 15c determines a country set as the estimation result in accordance with a predetermined condition.

For example, in a case where the estimated country information and area information are different from the country information and area information of the IP address identified by referring to the information of the organization that holds the IP address, the estimation unit 15c determines country information and area information set as the estimation result in accordance with a predetermined condition.

Specifically, first, the estimation unit 15c identifies an organization (ORG) that holds an IP address, country information (Country), and area information (Area) as illustrated in a section A of FIG. 4 by using registration information of the organization that holds the IP address registered in an open database.

In a case where this identification result is different from the estimation result based on the attribute information assigned to the path information exemplified in a section C of FIG. 5, the estimation unit 15c corrects the country information and the area information as illustrated in a section A' of FIG. 5 in accordance with a predetermined condition, and sets this as the estimation result.

As the predetermined condition, for example, it is possible to set such a condition that the correction is performed only in a case where both the country information and the area information are not matched, the correction is not performed in a case where the area information is matched, only the area information is corrected without correcting the country information depending on the region, uniform correction is not performed depending on the region, or the like. When the condition is set as described above, for example, with regard to a particular region such as Hong Kong where the number of cross border link information is high, it is possible to cope with a case where it is sufficient when only the area information is corrected without correcting the country information. In addition, with regard to a nearby region where even the country information is different, it is also possible to cope with a case where the correction is unnecessary.

In addition, the estimation unit 15c stores the estimation result in the country information DB 14c. That is, the estimation unit 15c associates and stores the range of the IP addresses represented by the prefix with the estimation result in the country information DB 14c. Thus, the user can highly accurately estimate the country where the IP address is located by referring to the country information DB 14c.

Figure 6:
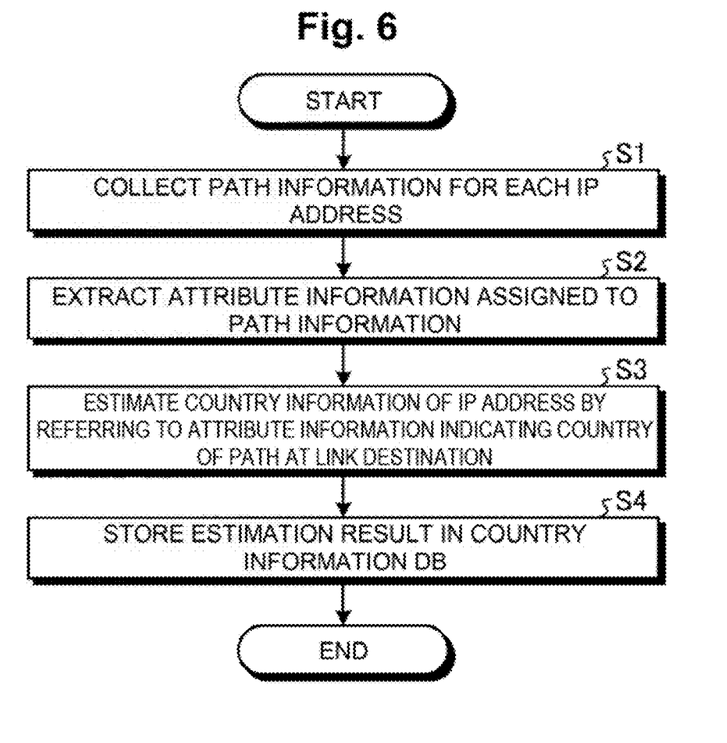
FIG. 6 is a flowchart illustrating a country estimation processing procedure.

[Country Estimation Processing] Next, with reference to FIG. 6, country estimation processing by the country estimation device 10 according to the present embodiment will be described. FIG. 6 is a flowchart illustrating a country estimation processing procedure. The flowchart of FIG. 6 is started at timing at which the user performs an operation input for a start instruction, for example.

First, the collection unit 15a collects the path information 14a for each IP address (step S1). That is, the collection unit 15a collects the path information 14a of the processing target for each destination IP address. Next, the extraction unit 15b extracts the attribute information assigned to the collected path information 14a (step S2).

Next, the estimation unit 15c refers to the attribute information indicating the country at the link destination of the path of the path information among the extracted attribute information, and estimates the country where the IP address is located. Specifically, the estimation unit 15c refers to the attribute information assignment system 14b of each AS, and identifies the country information at the link destination of the path of the path information assigned by the AS to estimate this as the country information of the IP address (step S3).

In addition, the estimation unit 15c stores the estimation result in the country information DB 14c (step S4). That is, the estimation unit 15c associates and stores the range of the IP addresses represented by the prefix with the estimation result in the country information DB 14c. Thus, the series of the country estimation processing is ended.

As described above, in the country estimation device 10 of the present embodiment, the collection unit 15a collects the path information 14a for each IP address. In addition, the extraction unit 15b extracts the attribute information assigned to the collected path information 14a. In addition, the estimation unit 15c refers to the attribute information indicating the country at the link destination of the path of the path information among the extracted attribute information, and estimates the country where the IP address is located.

Thus, the country estimation device 10 can estimate the country information of the IP address by using the highly reliable information that is the country information obtained on the basis of the country information grasped by the AS or a link state of the host under the AS itself by the AS. In this manner, the country estimation device 10 can highly accurately estimate the country where the IP address is located.

In addition, the estimation unit 15c further refers to the attribute information indicating the region where the city or the country at the link destination of the path of the path information is included among the extracted attribute information, and estimates the city information or the area information of the destination IP address. Thus, it is possible to estimate a location of the IP address at an appropriate accuracy in accordance with the region.

In addition, the estimation unit 15c further tabulates the extracted attribute information for each assignment system, and refers to the attribute information of the assignment system including the attribute information indicating that the link destination of the path of the path information is an IP address under the assignment source of the attribute information to estimate the country where the IP address is located. Thus, the country estimation device 10 can estimate the country where the IP address is located at a still higher accuracy on the basis of the more reliable information that is the country information of its own customer of the AS.

In addition, the estimation unit 15c further determines the country as the estimation result in accordance with the predetermined condition in a case where the estimated country is different from the country of the IP address identified by referring to the information of the organization that holds the IP address. Thus, the country estimation device 10 can estimate the country where the IP address is located at a still higher accuracy in accordance with the link state.

[Program] It is also possible to create a program in which processing to be executed by the country estimation device 10 according to the above-described embodiment is written in a computer executable language. In one embodiment, the country estimation device 10 can be implemented by installing a country estimation program for executing the above-described country estimation processing into a desired computer as package software or online software. For example, when the above-described country estimation program is executed by an information processing device, the information processing device can function as the country estimation device 10. The information processing device mentioned herein includes a desktop type or a laptop type personal computer. In addition to the above, a mobile communication terminal such as a smart phone, a mobile phone, and a PHS (Personal Handyphone System), and furthermore, a slate terminal such as a PDA (Personal Digital Assistant), and the like are included within a category of the information processing device. In addition, a function of the country estimation device 10 may also be implemented in a cloud server.

Figure 7:
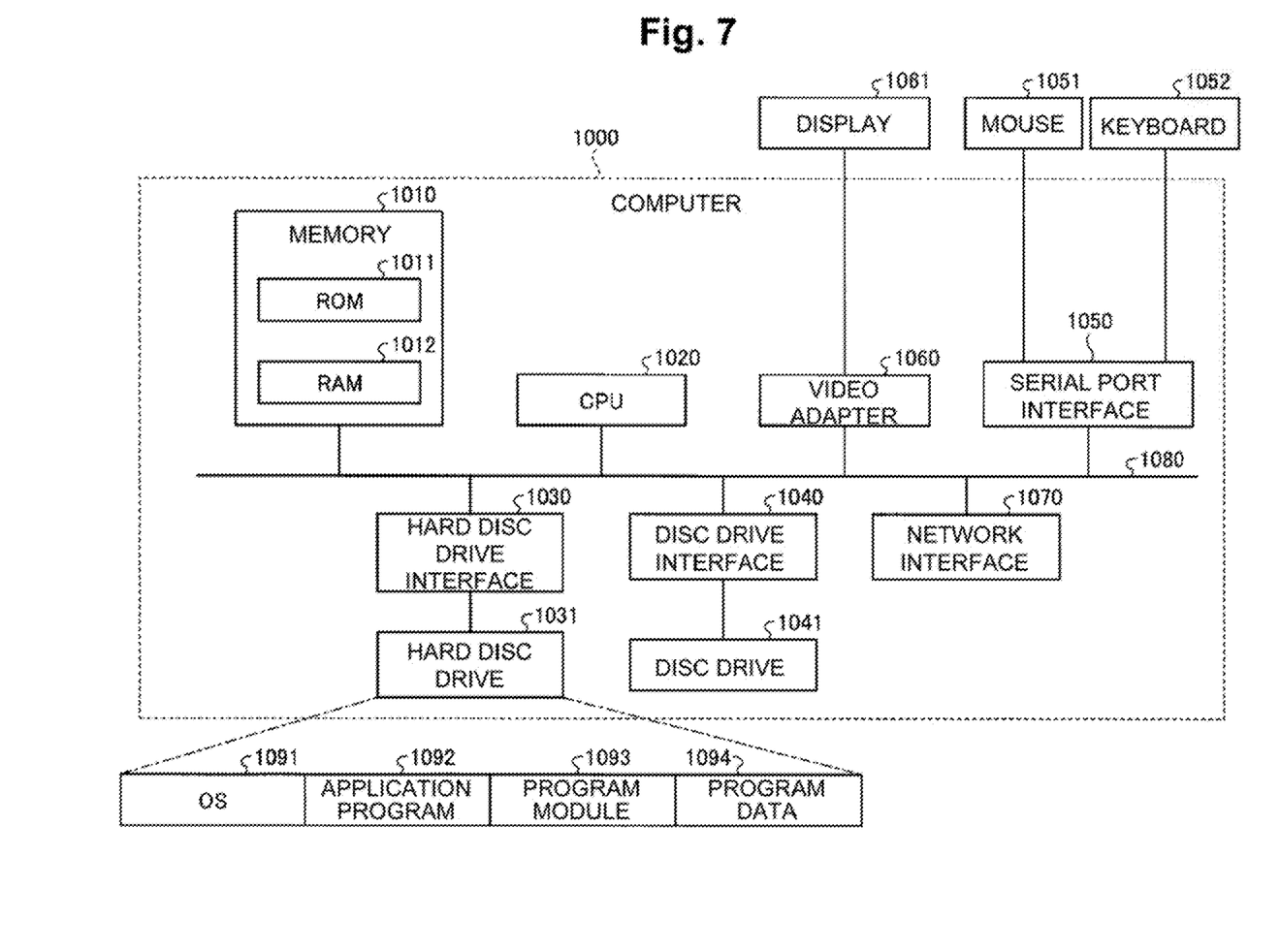
FIG. 7 is a diagram illustrating one example of a computer that executes a country estimation program.

FIG. 7 is a diagram illustrating one example of a computer that executes the country estimation program. The computer 1000 has, for example, a memory 1010, a CPU 1020, a hard disc drive interface 1030, a disc drive interface 1040, a serial port interface 1050, a video adapter 1060, and a network interface 1070. These respective units are connected to one another by a bus 1080.

The memory 1010 includes a ROM (Read Only Memory) 1011 and a RAM 1012. The ROM 1011 stores, for example, a boot program such as a BIOS (Basic Input Output System). The hard disc drive interface 1030 is connected to a hard disc drive 1031. The disc drive interface 1040 is connected to a disc drive 1041. A removable storage medium such as a magnetic disc or an optical disc is inserted into the disc drive 1041, for example. A mouse 1051 and a keyboard 1052 are connected to the serial port interface 1050, for example. A display 1061 is connected to the video adapter 1060, for example.

Herein, the hard disc drive 1031 stores, for example, an OS 1091, an application program 1092, a program module 1093, and program data 1094. Each piece of the information described according to the above-described embodiment is stored, for example, in the hard disc drive 1031 and the memory 1010.

In addition, the country estimation program is stored in the hard disc drive 1031 as the program module 1093 in which an instruction to be executed by the computer 1000 is written, for example. Specifically, the program module 1093 in which respective processes to be executed by the country estimation device 10 described according to the above-described embodiment are written are stored in the hard disc drive 1031.

In addition, data used for the information processing by the country estimation program is stored in the hard disc drive 1031 as the program data 1094, for example. Then, the CPU 1020 reads out the program module 1093 and the program data 1094 stored in the hard disc drive 1031 to the RAM 1012 as necessary, and executes the above-described respective procedure.

Note that the configuration is not limited to such a case that the program module 1093 and the program data 1094 related to the country estimation program are stored in the hard disc drive 1031, and for example, the program module and the program data may also be stored in a removable storage medium and read out via the disc drive 1041 or the like by the CPU 1020. Alternatively, the program module 1093 and the program data 1094 related to the country estimation program may also be stored in another computer connected via a network such as a LAN or a WAN (Wide Area Network) and read out via the network interface 1070 by the CPU 1020.

The embodiment to which the invention made by the inventor of the present invention has been described above, but the present invention is not limited by the descriptions and the drawings constituting part of disclosure of the present invention based on the present embodiment. That is, other embodiments, examples, utilization technologies, and the like made on the basis of the present embodiment by those skilled in the art are all included within the category of the present invention.

REFERENCE SIGNS LIST

10 Country estimation device
11 Input unit
12 Output unit
13 Communication control unit
14 Storage unit
14a Path information
14b Attribute information assignment system
14c Country information DB
15 Control unit
15a Collection unit
15b Extraction unit
15c Estimation unit

The invention claimed is:

1. A country estimation device comprising:
processing circuitry configured to:
collect path information for an IP address;
extract attribute information assigned to the collected path information; and
estimate a country where the IP address is located by referring to attribute information indicating a country at a link destination of a path of the path information among the extracted attribute information and a link type indicating a system to which the IP address belongs,
wherein, in a case that the attribute information indicates a plurality of possible countries in which the IP address is located, the processing circuitry is further configured to estimate a country appearing in the plurality of possible countries a majority of times as the country where the IP address is located.

2. The country estimation device according to claim 1, wherein the processing circuitry is further configured to tabulate the extracted attribute information for each assignment system, and refer to the attribute information of the assignment system including the attribute information indicating that the link destination of the path of the path information is an IP address under an assignment source of the attribute information to estimate the country where the IP address is located.

3. The country estimation device according to claim 1, wherein the processing circuitry is further configured to refer to the attribute information indicating a region where a city or a country at the link destination of the path of the path information is included among the extracted attribute information, and estimate the city or the region where the IP address is located.

4. The country estimation device according to claim 1, wherein the processing circuitry is further configured to determine a country as an estimation result in accordance with a predetermined condition in a case where the estimated country is different from a country of the IP address identified by referring to information of an organization that holds the IP address.

5. The country estimation device according to claim 4, wherein the predetermined condition includes a case that country information and region information in the attribute information do not match.

6. The country estimation device according to claim 4, wherein the predetermined condition indicates that only area information is to be corrected.

7. The country estimation device according to claim 4, wherein the predetermined condition indicates that no correction is to be performed for certain regions.

8. The country estimation device according to claim 1, wherein the link type indicates whether the IP address corresponds to a customer of the system to which the IP address belongs.

9. A country estimation method comprising:
collecting path information for an IP address;
extracting attribute information assigned to the collected path information; and
estimating a country where the IP address is located by referring to attribute information indicating a country at a link destination of a path of the path information among the extracted attribute information and a link type indicating a system to which the IP address belongs, by processing circuitry,
wherein, in a case that the attribute information indicates a plurality of possible countries in which the IP address is located, the method further comprises estimating a country appearing in the plurality of possible countries a majority of times as the country where the IP address is located.

10. A non-transitory computer-readable recording medium storing therein a country estimation program that causes a computer to execute a process comprising:
collecting path information for an IP address;
extracting attribute information assigned to the collected path information; and
estimating a country where the IP address is located by referring to attribute information indicating a country at a link destination of a path of the path information among the extracted attribute information and a link type indicating a system to which the IP address belongs,
wherein, in a case that the attribute information indicates a plurality of possible countries in which the IP address is located, the process further comprises estimating a country appearing in the plurality of possible countries a majority of times as the country where the IP address is located.

* * * * *